United States Patent
Darrow

[15] 3,660,731
[45] May 2, 1972

[54] FAIL-SAFE PULSATING PEAK DETECTION CIRCUIT

[72] Inventor: John O. G. Darrow, Murrysville, Pa.
[73] Assignee: Westinghouse Air Brake Company, Swissvale, Pa.
[22] Filed: Feb. 18, 1970
[21] Appl. No.: 12,297

[52] U.S. Cl. .................................317/148.5 R, 317/DIG. 6
[51] Int. Cl. ..........................................................H01h 47/32
[58] Field of Search .................317/147, 148.5, DIG. 6, 138

[56] References Cited

UNITED STATES PATENTS

| | | | |
|---|---|---|---|
| 2,695,378 | 11/1954 | Irvin | 317/DIG. 6 |
| 3,252,141 | 5/1966 | Galin | 317/138 X |
| 2,874,339 | 2/1959 | Perlman | 317/148.5 |
| 2,934,637 | 4/1960 | Wilcox | 317/148.5 X |
| 3,209,212 | 9/1965 | Billings | 317/148.5 X |

Primary Examiner—L. T. Hix
Attorney—H. A. Williamson, A. G. Williamson, Jr. and J. B. Sotak

[57] ABSTRACT

This disclosure relates to a fail-safe peak detector for detecting the presence of pulsating input signals and for providing an output signal which is proportional to the peak values of the input signals. The detector includes an amplifier having its input transformer coupled to the input signals and having its output transformer coupled to a bridge rectifier which is coupled to the coil of an electromagnetic relay which in turn controls an electrical contact of an indicating circuit.

15 Claims, 1 Drawing Figure

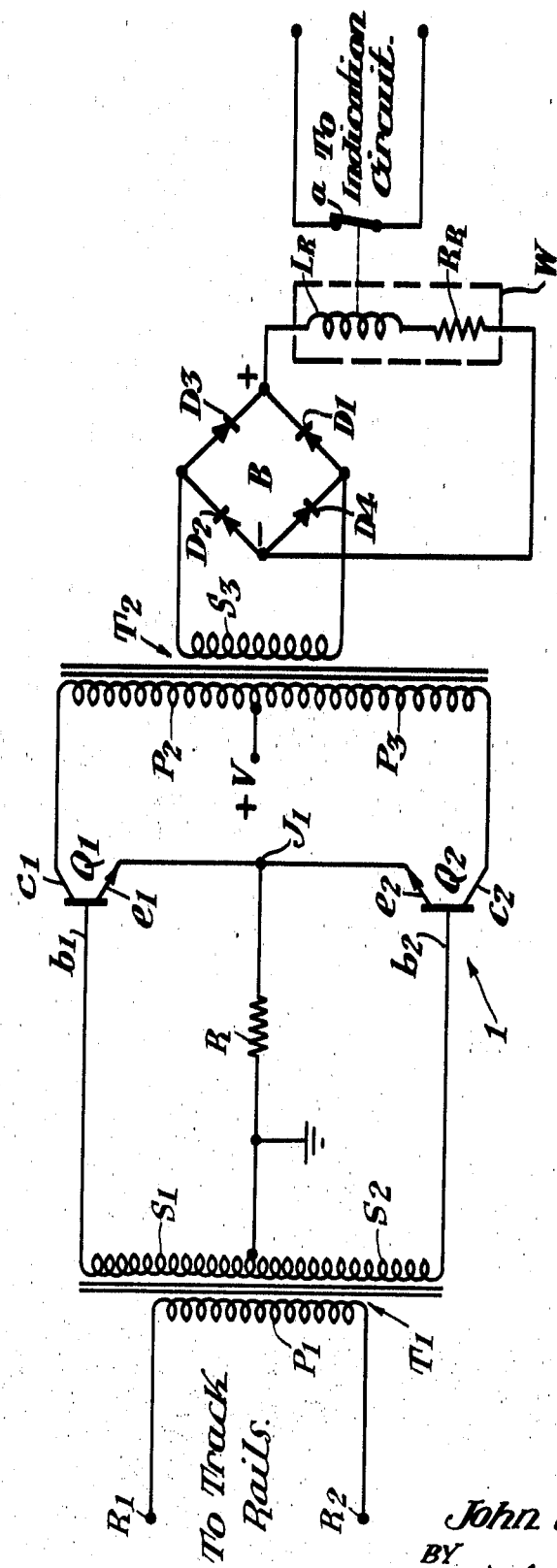

FAIL-SAFE PULSATING PEAK DETECTION CIRCUIT

My invention relates to a fail-safe current-type peak detector and more particularly to an electronic receiver detection circuit for detecting pulsating input signals and for producing an output signal which is independent of the pulse length of the pulsating input signals.

In railroad classification yards relatively short car detection track circuits are employed at certain locations, such as track switches, to detect the presence of a car or cut of cars within a given track section. These circuits incorporate a transmitter and a receiver electrically coupled across the rails at preselected spaced points along the track. A common deterrent to the successful use of track circuits in classification yards has been the fact that surface films are formed on the rails. These films are generally the result of dirt, rust, or grease as well as other contaminations and foreign materials which are ordinarily present in a railroad millieu. The poor condition of rails requires that a high power type of transmitter be employed in track circuits for classification yards so that effective film penetration and shunting may take place when the wheels of the car approach the receiver. In order to reduce the power requirements of the track circuit equipment, it has been found advantageous to operate the transmitter on an intermittent rather than on a continuous bases. This is accomplished by limiting the duty cycle of the transmitter. That is, the transmitter is not "ON" at all times but is arranged to generate short bursts or pulses of high frequency voltage signals having sufficient amplitude to penetrate the rail film. Thus, it will be appreciated that by selecting a satisfactory duty cycle and an appropriate pulse repetition rate, the average amount of power required by the transmitter is appreciably reduced. However, a need for improving the receiver signal detection circuit has arisen in pulsating types of high frequency track circuits. It has been found that previous types of receivers and particularly their detector circuits are not completely acceptable in that an adverse condition arises when the "ON" time of time operation. Further, it has been found that ordinary capacitive peak detectors require large power sources which defeat the use of a pulsing transmitter in the track circuit. In addition, a capacitive peak detector generates large current surges and transients which have an adverse effect on active elements, such as transistors and cause erratic operation of other related circuits. Thus, in the past, averaging types of voltage detection circuits were commonly employed in the receiver portion of the high frequency track circuits. It will be appreciated that the average amount of voltage is directly proportional to the duty cycle of the transmitter. Thus, as the duty cycle or "ON" time of the transmitter increases so does the average amount of output voltage of the receiver increase. This, of course, creates a situation where the vehicle shunting at the receiver end changes so that the track circuit is effectively shortened. That is, the track circuit length is decreased since the point where the approaching car wheels and axle shunt the transmitter signals is significantly closer to the receiver. Thus, the indication relay remains picked up longer so that the car is effectively allowed to move further into the track section than had originally been planned. Such receiver operation is intolerable in classification yards since any shortening of the track circuit length can result in cornering and switch splitting by the moving of railway cars. A further requisite of vital types of high frequency track circuits is that the apparatus operates in a fail-safe manner. For example, it is of paramount importance to ensure that a circuit or component failure must be incapable of simulating a safe condition. Such operation is mandatory in order to prevent injury to attending personnel and to eliminate damage to the railroad equipment and lading.

Accordingly, it is an object of my invention to provide a fail-safe electronic peak detection circuit.

Another object of my invention is to provide an improved peak pulse detector which is independent of the pulse width.

A further object of my invention is to provide an improved peak detection circuit having an output current which is independent of the duty cycle of the input voltage.

Yet another object of my invention is to provide an improved track circuit receiver for detecting the peaks of pulsating signals transmitted through the rails by a high power transmitter having a low duty cycle.

Still another object of my invention is to provide a fail-safe detector having an output current which is unrelated to the average amount of input voltage.

Still a further object of my invention is to provide a pulsating peak detection circuit which is unaffected by an increase in the duty cycle of the input voltage, which is free of current surges and spikes and which is incapable of producing an output signal during the absence of the input voltage.

Still yet another object of my invention is to provide an improved pulsating current-type peak detector which operates in a fail-safe manner so that a circuit or component failure is incapable of simulating a safe condition.

Yet a further object of my invention is to provide an improved fail-safe type of peak detection circuit having a voltage-to-current converter transformer coupled to a source of input voltage and also transformer coupled through AC-to-DC converter to an electromagnetic relay.

Still yet a further object of my invention is to provide a new and improved peak detector which is economical in cost, simple in construction, reliable in operation, durable in use and efficient in service.

Other features, objects and advantages of my invention will appear as the specification progresses.

In the attainment of the foregoing objects, my fail-safe pulsating peak detection circuit includes a voltage-to-current converter comprising a class B push-pull amplifier. The amplifier includes a pair of NPN transistors each having an emitter, a collector and a base electrode. An input transformer having a primary and a pair of secondary windings supply AC input signals to the amplifier. The primary winding is connected to a source of AC pulsating input signals having a relatively short duty cycle while the secondary windings each have one end directly connected to the base electrode of a respective transistor and have the other end connected to ground. An output transformer having a pair of primary windings and a secondary winding couples amplified AC signals to a diode bridge rectifier. One end of each primary winding is connected to a DC supply terminal while the other end is connected to the collector electrodes of the respective transistors. The emitter electrodes of the transistors are commonly connected to ground through an emitter load resistor. The secondary winding is connected to the AC terminals of the bridge rectifier while the DC terminals of the bridge rectifier are connected to the coil of an electromagnetic relay. The coil includes a series inductance and resistance, the parameters of which are selected to provide a long time constant relative to the pulse repetition period. Thus, the coil of the electromagnetic relay has a current flowing through it which is proportional to the peak values of the AC input signals and its self-induction causes load current to continue to flow through it during the interval period between the signal pulses.

For a more complete understanding of my invention as well as realizing other objects and advantages thereof, reference is made to the following detail description taken in conjunction with the accompanying FIGURE, which is a schematic diagram of the pulsating peak detection circuit in accordance with my invention.

Referring to the single FIGURE of the drawing, there is shown a voltage peak detection circuit which is generally characterized by the numeral 1. The detection circuit 1 forms the receiver portion of the high frequency track circuit and provides an indication of the presence and absence of a railway car within the track circuit. The receiver detection circuit is normally coupled to the opposite rails at a preselected distance from the point where the transmitter is coupled to the track rails. Thus, the high frequency voltage signals generated by the transmitter are transmitted through the rails and are picked up from the rail and applied to the input terminals R1 and R2.

The transmitter may take the form of an ordinary AC signal oscillator having a frequency of 50 kilohertz. The transmitter is pulsed 120 times per second and preferably has a duty cycle of approximately 8 to 10 percent. As previously mentioned, the purpose of utilizing an intermittent or low duty cycle rather than a continuous or full time transmitter is one of economics. Thus, the power requirements and overall cost of the track circuit equipment may be appreciably reduced since less costly components and supply sources may be employed. However, it will be appreciated that the peak values of the voltage signals produced by the low duty cycle transmitter must be of sufficient magnitude for penetrating rail films.

Returning now to the receiver end of the track circuit, it will be understood that the pulsating voltage signals are picked up from the rails and conveyed by suitable conductors to the input terminals R1 and R2 of the primary winding P1 of transformer T1. The transformer T1 includes a pair of center tapped secondary windings S1 and S2 forming the input circuit of the voltage-to-current converter. The voltage-to-current converter takes the form of a push-pull amplifier operating in class B service. The push-pull amplifier includes a first PNP-transistor Q1 having emitter $e1$, a collector electrode $c1$ and a base electrode $b1$ and a second PNP-transistor Q2 having emitter electrode $e2$, a collector electrode $c2$, and the base electrode $b2$. The upper terminal on the secondary winding S1 is directly coupled to the base electrode $b1$ of transistor Q1 while the lower terminal of secondary S2 is directly connected to the base electrode $b2$ of the transistor Q2. The center tap of the secondary windings is connected to one end of the carbon composition type of emitter degenerating resistor R1. The one end of resistor R and center tap are connected to a point of reference, such as, ground. The other end of resistor R is connected to a junction point which is common to both emitter $e1$ and $e2$ of transistors Q1 and Q2, respectively. The output circuit of the push-pull amplifier includes a pair of primaries P2 and P3 of a transformer T2. As shown, the upper terminal of the primary winding P2 is directly connected to the collector electrode $c1$ of transistor Q1 while the lower terminal of primary winding P3 is directly connected to collector electrode $c2$ of transistor Q2. The center tap of the primary windings is connected to the positive potential +V of a suitable source of DC supply voltage (not shown). The transformer T2 includes a secondary winding S3 which is directly connected to the AC terminals of a full-wave bridge rectifier B. As usual, the bridge rectifier B includes a plurality of diodes D1, D2, D3 and D4 which rectify the AC signals into a DC output. As shown, the positive terminal of the bridge rectifier B is directly connected to the coil or winding W of a vital type of electromagnetic relay which comprises an inductance LR and a given amount of series resistance RR. The other end of the relay coil or winding W is directly connected to the negative terminal of the bridge rectifier B. The coil W operates a movable contact $a$ which is normally closed when the relay is energized thereby indicating the absence of a car from the track circuit. The time constant LR/RR of the series inductance-resistance circuit of the coil is chosen to be relatively large when compared to the dead time or to the interval between the signal pulses, the purpose of which we describe hereinafter in greater detail.

It will be noted that the presence of the resistor R ensures that the input circuit of the push-pull amplifier is essentially a voltage source while the output circuit of the push-pull amplifier is essentially a current source. Assuming negligible voltage drop across the various electrodes of the transistors, it will be noted that the voltage drop across resistor R is effectively equal to the input voltage which appears across the secondary windings S1 and S2 of the input circuit. Further, the amount of output current flowing through the collector of transistors Q1 and Q2 is effectively equal to the current flowing through the emitter of the transistors which in turn flows through the resistor R. The turns ratio of the transformer T2 is so selected that a high output impedance is presented by the diode bridge when compared to the impedance of the relay coil. Thus by selecting appropriate turns ratio and resistance parameter, the output current rather than the output voltage becomes a function of the peak input voltage.

Proceeding now with the detailed description of the operation of the pulsating peak detection circuit according to the present understanding of the invention, it is initially assumed that no railway car is within the limits defined by the track circuit section. Further, assuming conditions are normal and that the equipment is functioning properly, the pulsating voltage signals generated by the transmitter are applied over suitable conductors to the track rails. These pulsating voltage signals are carried by the rails and appear at the receiver end of the track circuit. The pulsating voltage signals are picked up from the rails and are applied to the input terminals R1 and R2 of the primary winding P1 of transformer T1. It is presumed for the purpose of convenience that a positive alternation of the 50 kilohertz signal is initially received so that the terminal R1 is positive with respect to terminal R2.

The transformer T1 is wound such that primary winding P1 induces a voltage having a polarity which in this instance causes the upper terminal of secondary winding S1 to be positive and the lower terminal of secondary winding S2 to be negative. Thus, the positive swing in the secondary winding S1 forwardly biases the base-emitter electrodes $b1-e1$ so that transistor Q1 is rendered conductive while the positive swing in the secondary winding S2 opposes and reversely biases the base-emitter electrodes $b2-e2$ so transistor Q2 remains nonconductive. Thus, output current flows from the positive terminal +V, through the primary winding P2 of transformer T2, through the collector $c1$ and emitter $e1$ of transistor Q1 to junction J1 through resistor R to ground. Let us assume that the transformer T2 is wound in phase so that the polarity of the signal induced in secondary winding S3 at this time is the same as that of the primary winding P2. Thus, current flows from the lower terminal of secondary winding S3, through diode D1, through the inductance LR and resistor RR of the relay coil, through diode D2 to the upper terminal of the secondary winding S3. Thus, with current flowing through coil W, the electromagnetic relay will become energized thereby closing contact $a$. The closing of contact $a$ completes the indication circuit which, in turn, designates that no vehicle or car is present in the track circuit. Now when the negative alternation of the 50 kilohertz signal appears across terminals R1 and R2 the primary winding P1 induces a signal in secondary windings S1 and S2 which is in phase therewith. Now the induced voltage in secondary winding S2 will forwardly bias the base-emitter electrodes $b2-e2$ so that transistor Q2 will conduct while the induced voltage in secondary winding S1 will reversely bias the base-emitter electrodes $b1-e1$ so that transistor Q1 will become nonconductive. Thus, current now flows from the DC source terminal +V through the primary winding P3, through the collector $c2$ and emitter $e2$ of transistor Q2, to the junction J1, through resistor R to ground. Now, the primary winding P3 induces a signal in secondary winding S3 which is of the opposite polarity to that induced by primary winding P3, thus current will now flow from the upper terminal of secondary winding S3, through diode D3, through inductance LR and resistor RR, of the relay coil, through diode D4 to the lower negative terminal of the secondary winding S3. During the next half cycle, the transistor Q1 will again conduct and produce a signal across primary winding P2. This alternate operation of the transistor will continue for the entire duty cycle of the transmitter so that the corresponding signals are generated in the respective halves of the primary windings of transformer T2. Thus, current will continue to be supplied to the coil W of the electromagnetic relay for the entire pulse width or duty cycle.

With a zero-biased class B push-pull amplifier a slight amount of crossover distortion occurs, but by and large the waveform of the output current closely resembles the curve of the input voltage which in this case may be sine-wave. As previously mentioned, the duty cycle or pulse width of the transmitter is only approximately 10 percent of the total time or pulse repetition period. It will be appreciated that in order to preclude an erroneous car presence indication, the front contact a of the electromagnetic relay must remain closed during period or time in which the pulsating 50 kilohertz signals do not appear on input terminals R1 and R2. During the transmitter off-time period, the characteristics of the relay, namely, the inductive and magnetic properties are employed for maintaining the relay in its picked-up condition. As previously mentioned, the time constant LR/RR of the relay coil is chosen to be relatively large in comparison to the off-time period of the transmitter. The drastic reduction, namely, the cutting off of current being supplied by the amplifier causes a variation in the magnetic field which results in the generation of a back EMF. Thus, the self-induction of the inductor LR causes current to continue to flow in the same direction through the series inductance circuit. It will be noted that the polarity of the diodes in bridge rectifier B is such that effective snubbing or shunting action will occur, and therefore sufficient current flows through the coil W for holding contact a closed.

Hence when the next succeeding 50 kilohertz signal pulse appears across terminals R1 and R2 current will again be supplied to the electromagnetic coil W by the push-pull amplifier. Thus, it will be appreciated that the output current is purely a function of the peak value of the input signal pulses due to the integration of the RL circuit.

Now, let us assume that for some unforeseen reason the duty cycle of the transmitter increases. It will be noted that the length of the duty cycle has no effect on the operation of the presently described detection circuit. That is, an increase in the transmitter duty cycle even to a full "ON" condition does not change the amount of output current flowing through the electromagnetic coil W. Since the peak values of the 50 kilohertz signals are independent of the pulse width, it is impossible to increase output current level of the pulsating peak detection circuit 1. Such operation ensures that the opening of the relay contact a will coincide with the passing of each railway vehicle or car at a preselected point in the track circuit. For example, when the railway car approaches a certain point at the receiver end of the track circuit, the 50 kilohertz pulsating voltage signal being produced by the transmitter will be effectively shunted by the front wheels and axle. With no voltage signal available on terminals R1 and R2 the push-pull amplifier returns to a quiescent condition and after a short period of time which is dependent upon the decay period of the series inductance circuit the contact a will open. Thus the opening of contact a will accurately signal the presence of a railway vehicle within the defined limits of the track circuit.

Further it will be noted that the presently described peak detection circuit operates in a fail-safe manner in that no circuit or component failure is capable of simulating a false condition. That is, the electromagnetic relay is incapable of being energized when any failure occurs in the detection circuits. For example, if any element of the circuit, with exception of resistor R becomes short-circuited the output power to the electromagnetic relay is either removed or drastically reduced so that contact a becomes opened to positively signify the presence of a railway car in the track circuit. It will be noted that the shorting of any transformer winding reduces the transformer ratio which in turn diminishes the amount of current flowing through coil W. Similarly, any short circuiting of the transistor electrodes destroys the amplifying characteristics of the amplifier, which, in turn reduces the output current. A short-circuited diode results in a shunting action in the relay coils so that little, if any, output current is available for energizing the relay. As is previously mentioned, the resistor R is preferably constructed of carbon composition so that it is improbable, if not impossible, for the resistor to short circuit. It will be further noted that if any circuit component becomes opened either the transformer coupling or the amplifying characteristics of this detection circuit are destroyed so that it is impossible to increase current flow through the relay coil W. For example, an open-circuited primary or secondary winding either completely eliminates the signal or effectively reduces the signal to one-half of its peak value so that no current or at least less current will flow through the coil W of the relay. An open-circuited transistor destroys the amplifying characteristics of a push-pull amplifier so that no increase in current can result. The opening of resistor R completely removes the input signal from the push-pull amplifier so that current completely ceases to flow through the coil W of the relay. Similarly, opening of any one or more of the diodes causes at least one-half of the cycle, if not both alternations to disappear so that the output current is either reduced or removed. Thus, a failure in the presently described pulse peak detection circuit is incapable of falsely energizing the relay.

Thus, the pulsating peak detector circuit 1 not only is unaffected by an increase in the pulse width of the pulsating input signal which could be caused by a circuit failure in the transmitter, but also is incapable of producing a false output due to the presence of a circuit or component failure.

While my invention has been described with reference to track circuits for classification yards, it should be understood that the detection circuit may be used in other track circuit applications. It is also understood that the presently described detection circuit may be used not only in other railroad applications but also in other industrial, commercial as well as other places where similar needs and conditions exist.

Although NPN transistors have been illustrated, it is understood that transistors of the opposite conductivity, that is, PNP transistors may be used in the circuit with a reversal of energizing potential as is well known.

Further while my invention has been described with reference to a particular embodiment thereof, it will be understood that various modifications, changes and variations may be made by those skilled in the art without departing from the invention. The appended claims are therefore intended to cover all such modifications within the true spirit and scope of the invention.

Having thus described my invention, what I claim is:

1. A fail-safe peak detector for detecting a pulsating input signal and for producing an output signal which is independent of the pulse width of the pulsating input signal comprising, a source of coded pulsating input signals having a low duty cycle in comparison to the pulse repetition rate, a first coupling circuit connected to said source of coded pulsating input signals, a voltage-to-current converter having its input connected to said first coupling circuit, an AC-to-DC converter connected to the output of said voltage-to-current converter by a second coupling circuit, and an integrating circuit means coupled to the output of said AC-to-DC converter for causing load current to continue to flow during the interval between successive coded input pulses and said peak detector being incapable of increasing said load current during a critical circuit or component failure.

2. A fail-safe peak detector as defined in claim 1, wherein said first coupling means comprises a transformer having a primary and a pair of secondary windings.

3. A fail-safe peak detector as defined in claim 1, wherein said voltage-to-current converter comprises an amplifying circuit having two active elements.

4. A fail-safe peak detector as defined in claim 1, wherein said voltage-to-current converter comprises a class B push-pull amplifier.

5. A fail-safe peak detector as defined in claim 1, wherein said AC-to-DC converter comprises a full-wave bridge rectifier.

6. A fail-safe peak detector as defined in claim 1, wherein said second coupling circuit comprises a transformer having a pair of primary windings and a secondary winding.

7. A fail-safe peak detector as defined in claim 1, wherein said integrating circuit means includes an electromagnetic relay.

8. A fail-safe peak detector as defined in claim 7, wherein said electromagnetic relay includes a magnetic coil coupled to the output of said AC-to-DC converter and an electrical contact connected to an indication circuit.

9. A fail-safe peak detector as defined in claim 8, wherein said magnetic coil includes a series inductance and resistance elements.

10. A fail-safe peak detector as defined in claim 9, wherein the time constant of said series inductance and resistance elements is substantially longer than the pulse repetition period of said coded pulsating input signal.

11. A fail-safe current-type of peak detection circuit comprising a source of coded pulsating signals having a low duty cycle in comparison with the pulse repetition rate, an input transformer having a primary winding electrically connected to said pulsating signal source and having a pair of secondary windings, a push-pull amplifier, said pair of secondary windings electrically connected to the inputs of said push-pull amplifier, and an output transformer having a pair of primary windings and a secondary winding, said pair of secondary windings electrically connected to the output of said push-pull amplifier, a rectifier having its input terminals connected to said secondary winding and having its output terminals connected to a coil of an electromagnetic relay which remains picked up during the off periods of said coded pulsating signals and which is incapable of being picked up by a critical circuit or component failure.

12. A fail-safe current-type of peak detection circuit as defined in claim 11, wherein said coded pulsating signal source comprises a high frequency signal source having a duty cycle of approximately 10 percent of the time.

13. A fail-safe current-type of peak detection amplifier includes a pair of semiconductive devices operating in class B service.

14. A fail-safe current-type of peak detection circuit as defined in claim 11, wherein said rectifier comprises a full-wave bridge rectifier.

15. A fail-safe current-type of peak detection circuit as defined in claim 11, said coil of said electromagnetic relay comprises a series conductive resistive circuit having a time constant which is relatively large in comparison with said pulse repetition rate.

* * * * *

PO-1050
(5/69)

UNITED STATES PATENT OFFICE
CERTIFICATE OF CORRECTION

Patent No. 3,660,731                    Dated May 2, 1972

Inventor(s)    John O. G. Darrow

It is certified that error appears in the above-identified patent and that said Letters Patent are hereby corrected as shown below:

Claim 13, Column 8 should read

"A fail-safe current-type of peak detection circuit as defined in Claim 11, wherein said push-pull amplifier includes a pair of semiconductive devices operating in class B service."

instead of

"A fail-safe current-type of peak detection amplifier includes a pair of semiconductive devices operating in class B service."

Signed and sealed this 17th day of October 1972.

(SEAL)
Attest:

EDWARD M. FLETCHER, JR.                    ROBERT GOTTSCHALK
Attesting Officer                          Commissioner of Patents